(12) United States Patent
Tseng et al.

(10) Patent No.: US 12,722,229 B2
(45) Date of Patent: Sep. 1, 2026

(54) LASER WELDING MECHANISM

(71) Applicant: GENII IDEAS CO., LTD., Hsinchu City (TW)

(72) Inventors: Kuo Chiang Tseng, Hsinchu City (TW); Nan Kai Weng, Hsinchu City (TW); Chih Yu Weng, Hsinchu City (TW); Pei Yu Wang, Hsinchu City (TW); Tzu Wen Sung, Hsinchu City (TW); Feng Chi Wei, Hualien City (TW); Mao Te Chuang, Hsinchu City (TW)

(73) Assignee: GENII IDEAS Co., Ltd., Hsinchu City (TW)

( * ) Notice: Subject to any disclaimer, the term of this patent is extended or adjusted under 35 U.S.C. 154(b) by 521 days.

(21) Appl. No.: 18/488,361

(22) Filed: Oct. 17, 2023

(65) Prior Publication Data

US 2025/0058412 A1 Feb. 20, 2025

(30) Foreign Application Priority Data

Aug. 15, 2023 (TW) ................................ 112130628

(51) Int. Cl.
*B23K 26/282* (2014.01)

(52) U.S. Cl.
CPC ................................. *B23K 26/282* (2015.10)

(58) Field of Classification Search
CPC . B23K 26/282; B23K 26/082; B23K 26/0884
See application file for complete search history.

(56) References Cited

U.S. PATENT DOCUMENTS 4,001,543 A * 1/1977 Bove .................. B23K 26/282
219/121.74

* cited by examiner

*Primary Examiner* — Robert G Bachner
(74) *Attorney, Agent, or Firm* — Rosenberg, Klein & Lee

(57) ABSTRACT

A laser welding mechanism includes a main body having a space and two securing devices which are respectively attached to two ends of the body. A linkage assembly includes a bearing and a linkage tube. A refraction mirror unit includes two mirrors connected to the linkage tube of the linkage assembly. A laser unit is pivotally connected to a swinging member which is connected to the linkage tube of the linkage assembly. A drive unit including a motor, a driving gear, and a driven gear. A rotation unit is connected to the swinging member of the laser unit. The laser unit rotates relative to the first workpiece and the second workpiece during welding, ensuring a stable rotation at the joining faces of the two workpieces.

10 Claims, 9 Drawing Sheets

LASER WELDING MECHANISM

FIELD OF THE INVENTION

The present invention relates to a welding mechanism, and more particularly, to a laser welding mechanism.

BACKGROUND OF THE INVENTION

When welding circular pipe fittings in factories, due to the challenging nature of processing circular pipe fittings, it is a common practice for welding personnel to manually hold a welding gun and rotate around the seam to weld it. However, manual welding as the primary method can result in uneven and inconsistent welds, as well as the formation of porosity, leading to the embrittlement of the welded components. Additionally, manual operation requires a significant amount of time and results in slow welding speeds, necessitating improvements.

In view of the problems associated with the conventional welding of pipe fittings mentioned above, the invention develops laser welding mechanism to eliminate the shortcomings mentioned above, and to enhance product quality and welding speed. The secondary objective of this invention is to provide a laser welding mechanism for rapid positioning of workpieces.

SUMMARY OF THE INVENTION

The present invention relates to a laser welding mechanism and comprises a body having a space formed therein. Two securing devices are respectively connected to two ends of the body. A linkage assembly comprises a bearing and a tube, wherein the bearing is connected to two seats on the body. The tube is connected to the bearing and located within the space of the body. The tube has a slot defined through the wall thereof. A refraction mirror unit with two mirrors which are connected to the tube of the linkage assembly. A laser unit is pivotally connected to a swinging member, and the swinging member has a connecting part connected to the tube of the linkage assembly. The laser unit is located corresponding to the slot of the tube. A drive unit comprises a motor, a driving gear, and a driven gear. The motor is connected to the driving gear which is engaged with the driven gear. The driven gear is connected to the swinging member. A rotation unit is connected to the swinging member of the laser unit and drives the laser unit to rotate an angle.

Preferably, the body comprises a track connected to the two seats.

Preferably, the laser unit comprises a pulley that cooperates with the track of the body. The swinging member of the laser unit has a center point.

Preferably, the body comprises a plate which is connected to one side of the body and located corresponding to the slot of the tube.

Preferably, the bearing of the linkage assembly is a double-row roller bearing. The bearing has a groove defined in the outer surface thereof.

Preferably, the tube of the linkage assembly has a protrusion, and the protrusion is fitted into the groove of the bearing.

Preferably, the drive unit is adjacent to or connected to the body.

Preferably, two respective vertical centerlines of the two mirrors form an angle of 100 degrees with each other.

Preferably the rotation unit is driven by a stepper motor, a servo motor, or manual operation.

Preferably, the rotation unit drives the laser unit to rotate either 15 degrees clockwise or 15 degrees counterclockwise.

This invention achieves stable and precise welding of the first workpiece and the second workpiece by utilizing a laser unit in combination with the linkage assembly and the refraction mirror unit. The laser unit rotates relative to the first workpiece and the second workpiece during welding, ensuring a stable rotation at the joining faces of the two workpieces. The laser unit directs the laser beam onto the refraction mirror unit, which in turn reflects the laser beam onto the joining faces of the first workpiece and the second workpiece using two mirrors. This accelerates the automation of the welding process while maintaining welding quality.

This invention utilizes a plate on the body to rotate it into the space of the main body. The first workpiece is then inserted from the left side of the body into the space and brought into contact with the plate. The first workpiece's position is secured using the securing devices. The second workpiece is then inserted from the right side into the space, ensuring that its end face comes into contact with the first workpiece. This process achieves rapid and precise positioning.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
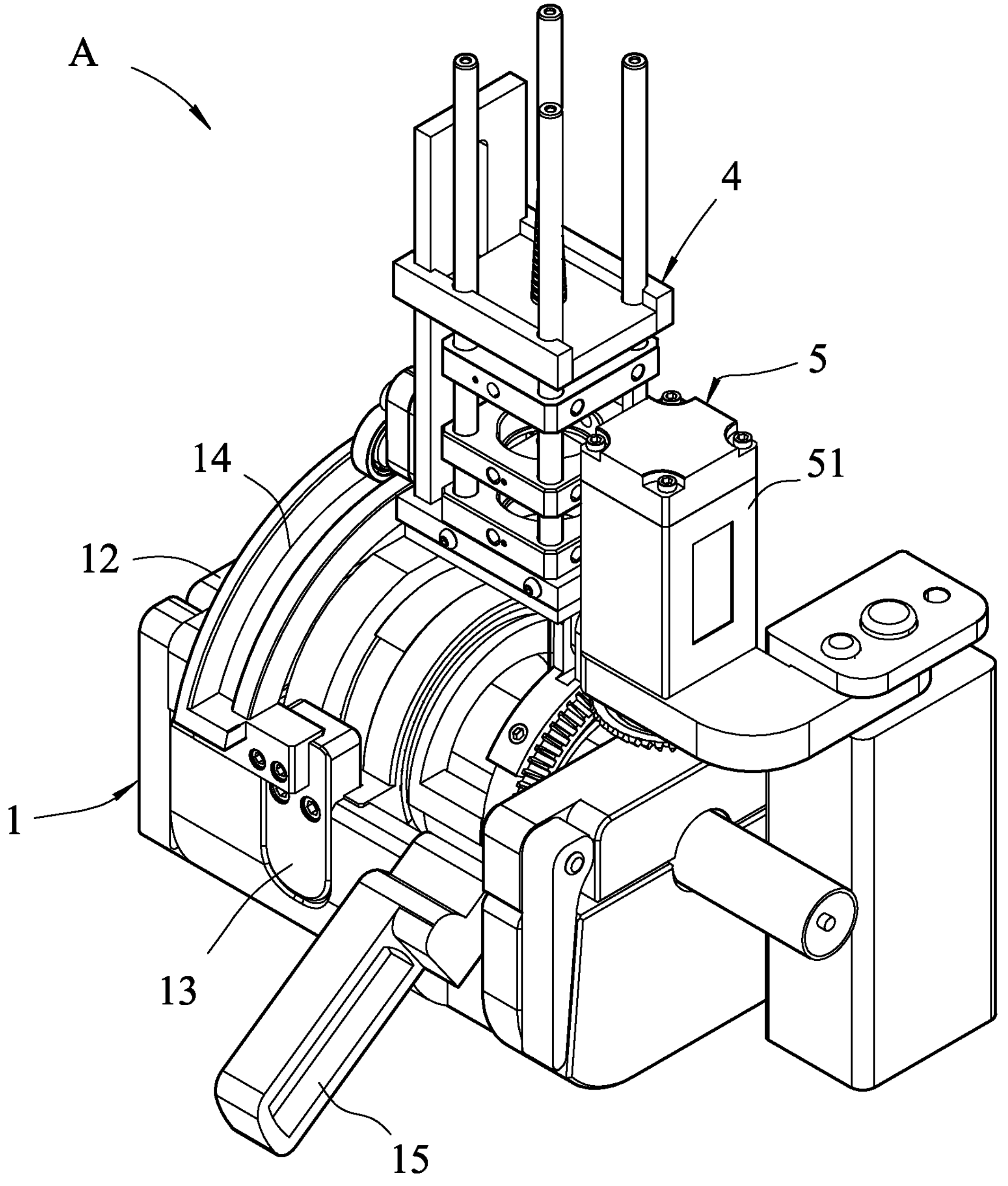
FIG. 1 is a perspective view to show the laser welding mechanism of the present invention.
Figure 2:
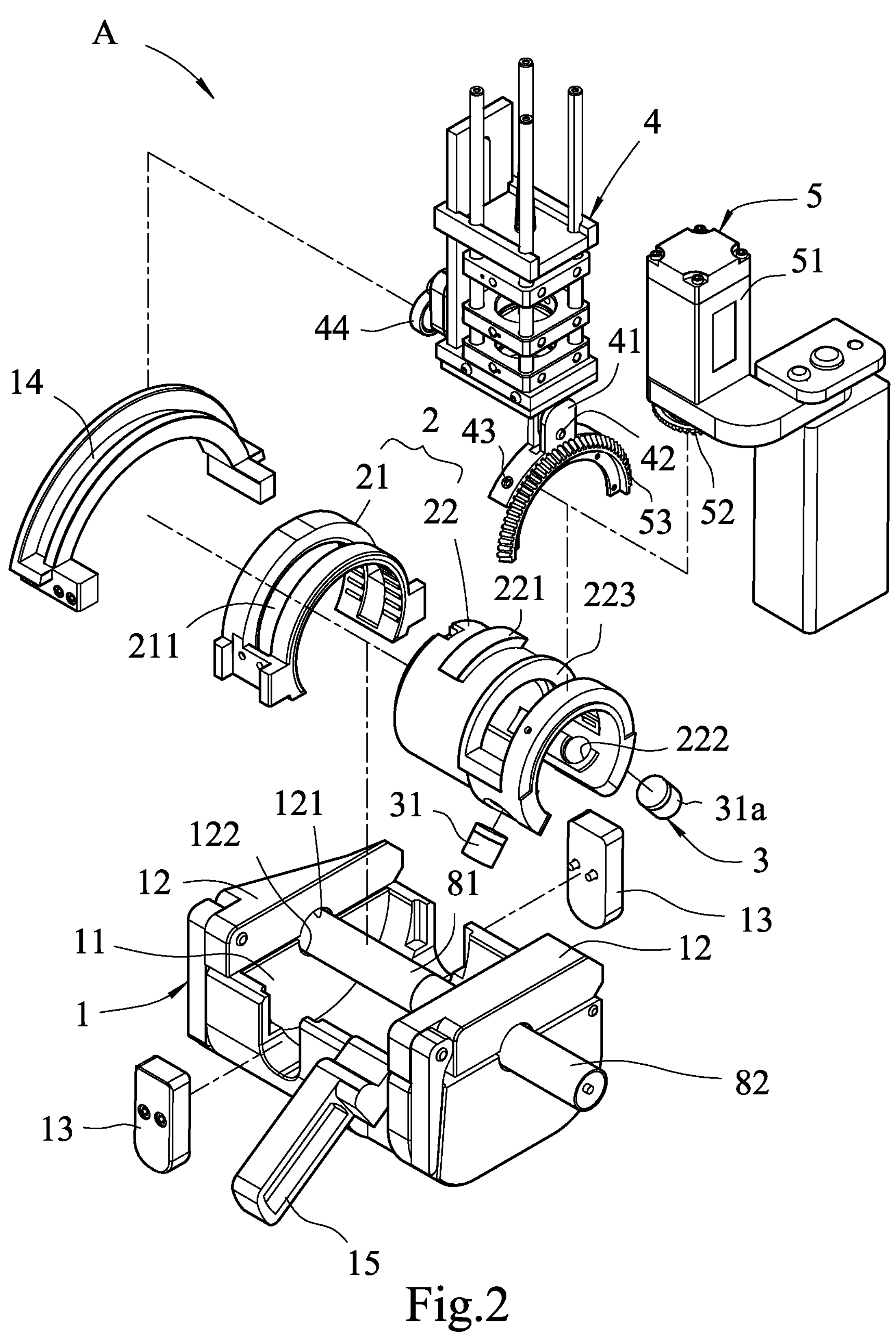
FIG. 2 is an exploded view to show the laser welding mechanism of the present invention.
Figure 3:
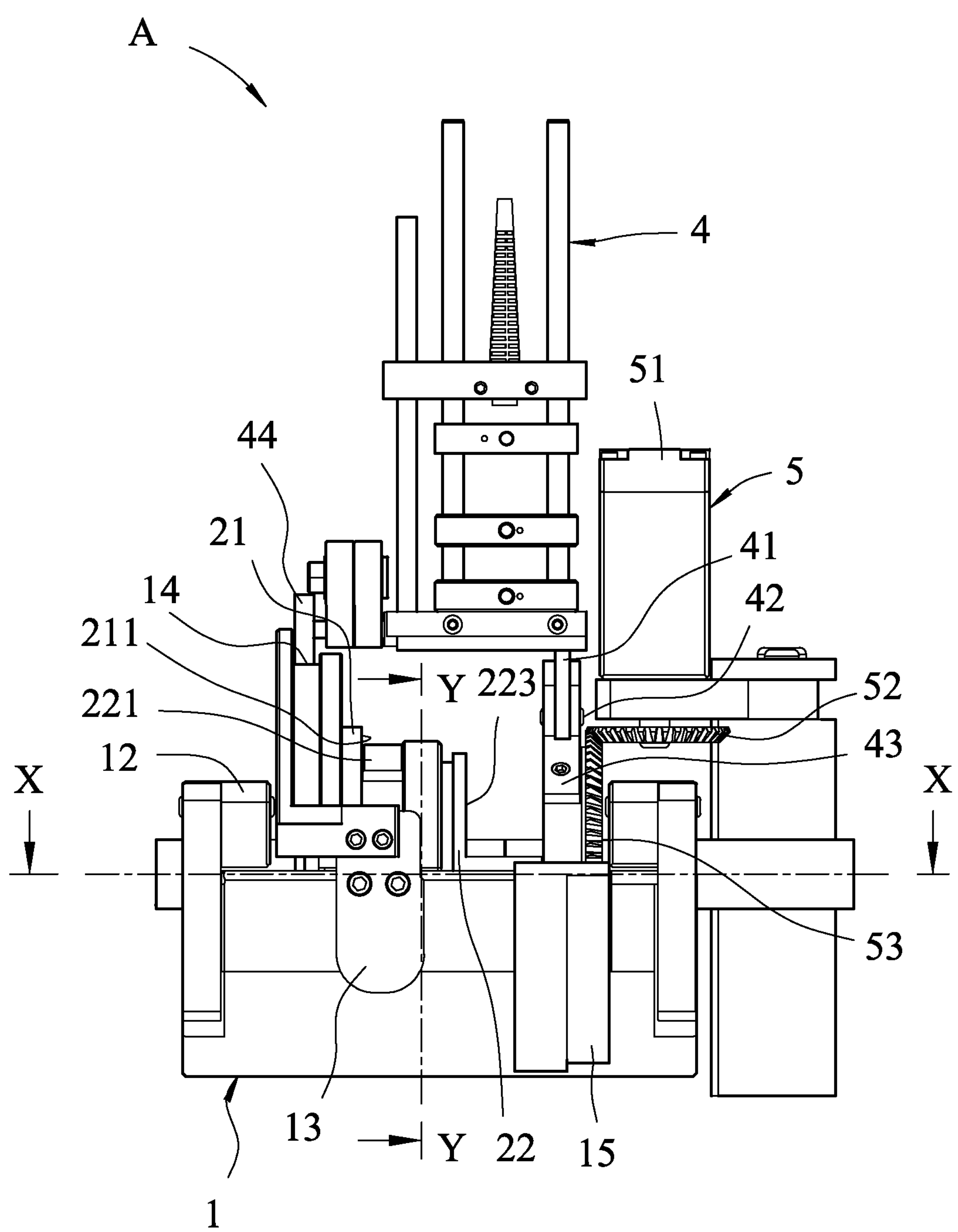
FIG. 3 is a front view to show the laser welding mechanism of the present invention.
Figure 4:
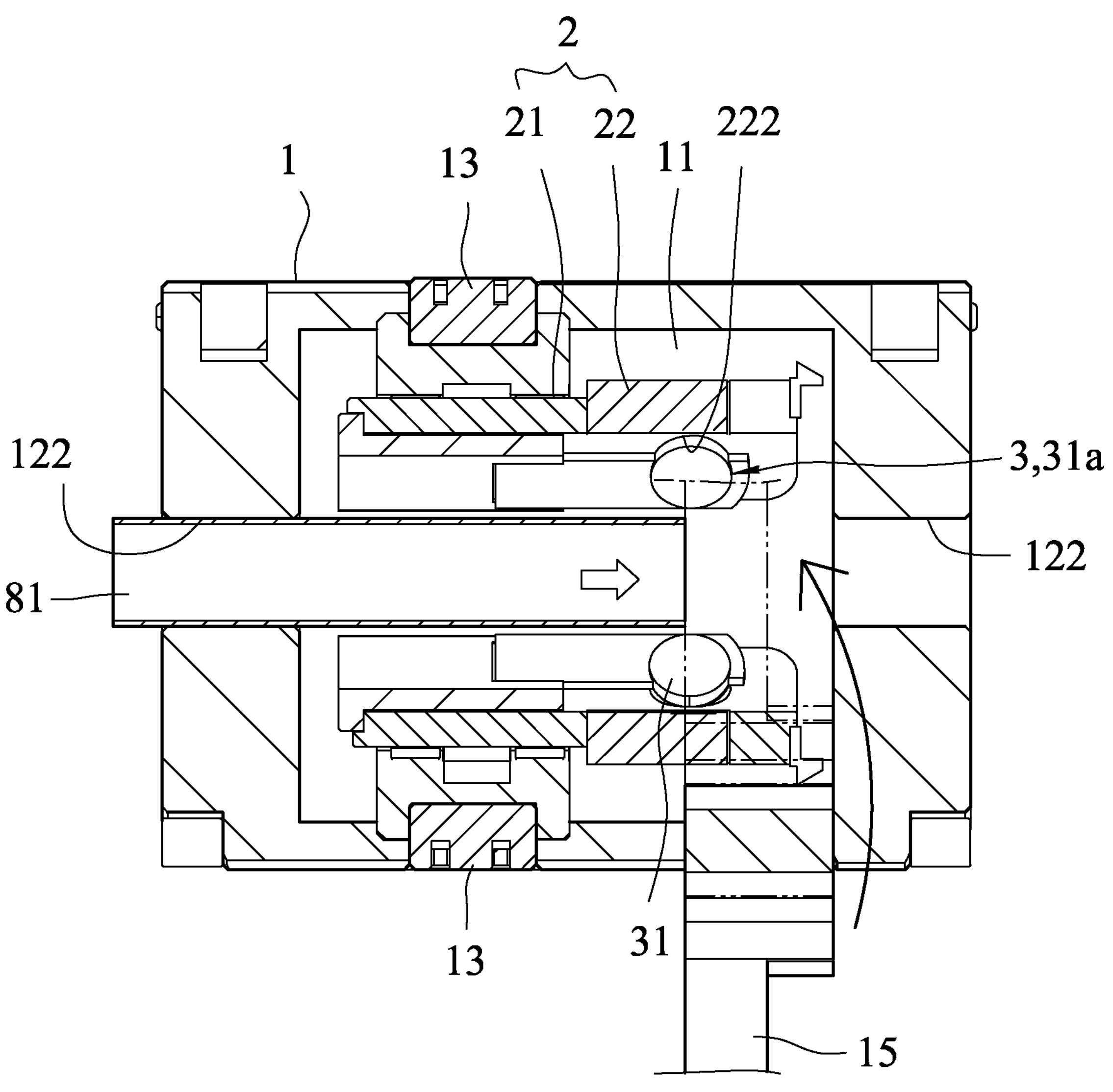
FIG. 4 is an end cross sectional view, taken along line X-X in FIG. 3.
Figure 5:
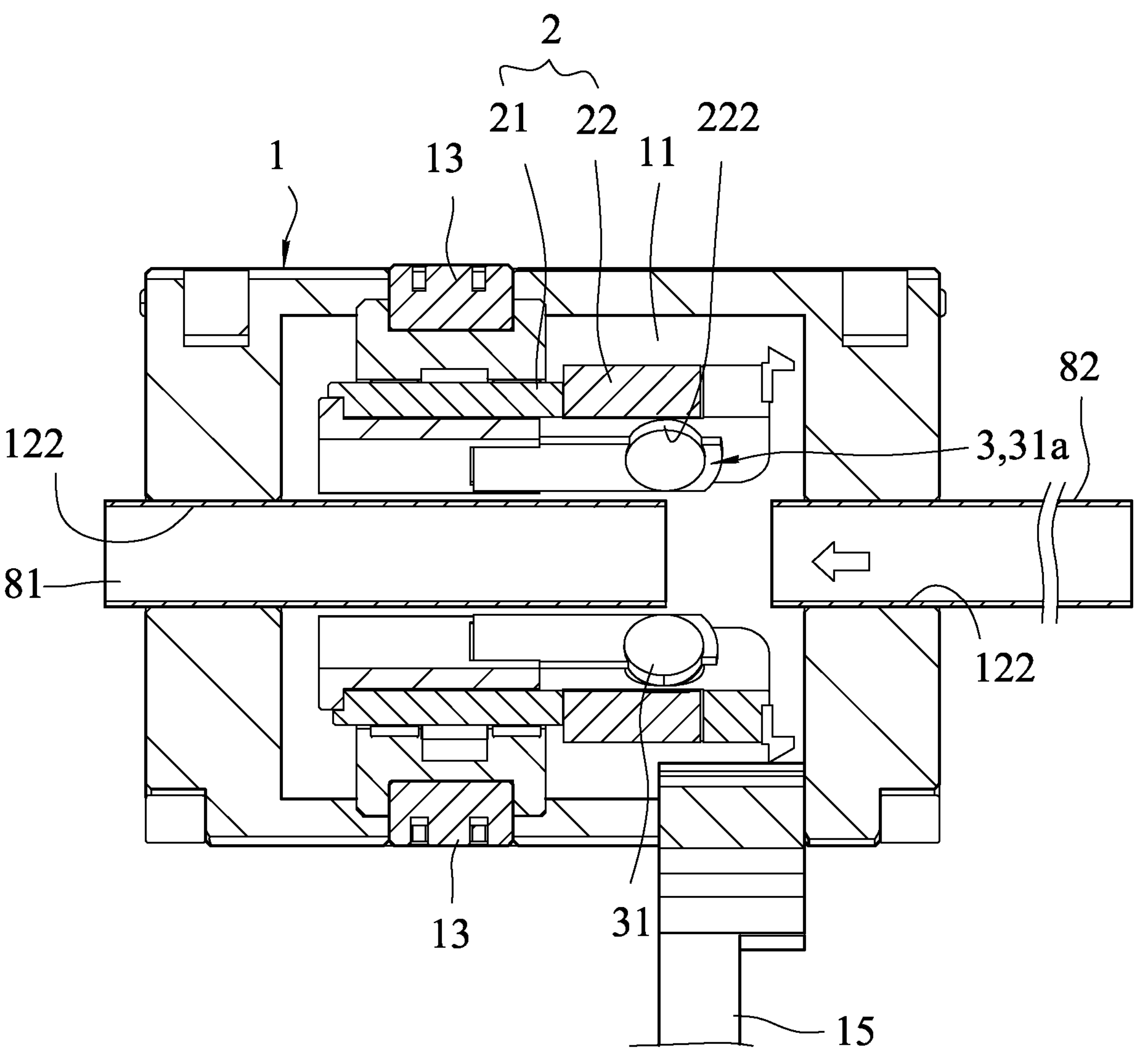
FIG. 5 shows that the first and second workpieces are positioned in the body.

Referring to FIGS. 1 to 7, the laser welding mechanism "A" of the present invention comprises a body 1 having a space 11 formed therein. Two securing devices 12 are respectively connected to two ends of the body 1. Each of the two securing devices 12 includes a top notch 121 defined in a lower end thereof. The body 1 includes two bottom notches 122 which are located corresponding to the two top notches 121. The body 1 comprises a track 14 connected to the two seats 13. In addition, the body 1 comprises a plate 15 which is connected to one side of the body 1.

A linkage assembly 2 comprises a bearing 21 and a tube 22, wherein the bearing 21 is connected to two seats 13 on the body 1. The tube 22 is connected to the bearing 21 and located within the space 11 of the body 1. The tube 22 has a slot 223 defined through the wall thereof. The bearing 21 of the linkage assembly 2 is a double-row roller bearing. The bearing 21 has a groove 211 defined in the outer surface thereof. The tube 22 of the linkage assembly 2 has a protrusion 221, and the protrusion 221 is fitted into the groove 211 of the bearing 21.

A refraction mirror unit 3 with two mirrors 31, 31*a* which are positioned in two recesses 222 of the tube 22 of the linkage assembly 2. The two respective vertical centerlines of the two mirrors 31, 31*a* form an angle of 100 degrees with each other.

A laser unit 4 is pivotally connected to a swinging member 41, and the swinging member 41 has a connecting part 43 connected to the tube 22 of the linkage assembly 2. The laser unit 4 is located corresponding to the slot 223 of the tube 22. The laser unit 4 comprises a pulley 44 that moves in the track 14 of the body 1. The swinging member 41 of the laser unit 4 has a center point 42.

A drive unit 5 comprises a motor 51, a driving gear 52, and a driven gear 53. The motor 51 is connected to the driving gear 52 which is engaged with the driven gear 53. The driven gear 53 is connected to swinging member 41 and is located corresponding to the slot 223 of the tube 22 of the linkage assembly 2. The drive unit 5 is adjacent to or connected to the body 1.

A rotation unit 6 is connected to the swinging member 41 of the laser unit 4 and drives the laser unit 4 to rotate an angle. Preferably the rotation unit 6 is driven by a stepper motor, a servo motor, or manual operation.

Figure 6:
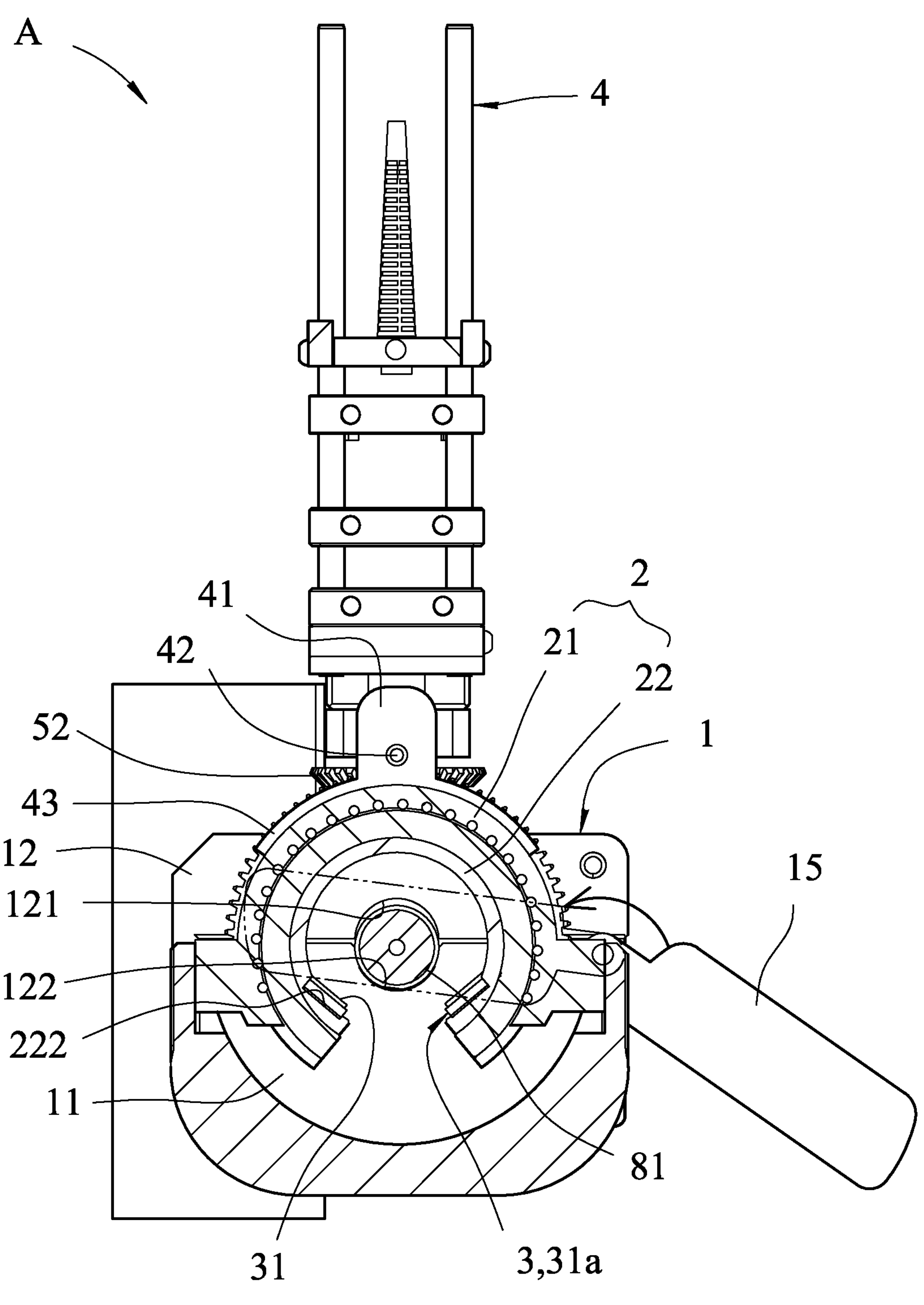
FIG. 6 is an end cross sectional view, taken along line Y-Y in FIG. 3.

When in operation, the first workpiece 81 is positioned in the bottom notch 122 of the securing device 12. The first workpiece 81 then extends through the bearing 21 and the tube 22, and the plate 15 is rotated to be engaged with the slot 223 of the tube 22 (as shown in FIG. 6). The first workpiece 81 is then pushed into to contact against the plate 15, and the plate 15 is then returned to its original position and secured using the securing device 12 to ensure the first workpiece 81 is firmly positioned. Next, the second workpiece 82 is inserted from the bottom notch 122 of the other securing device 12 and pushed until its end face comes into contact with the end face of the first workpiece 81. This setup allows the laser unit 4 to perform welding operations at approximately 120 degrees to the joining faces of the first workpiece 81 and the second workpiece 82.

Figure 7:
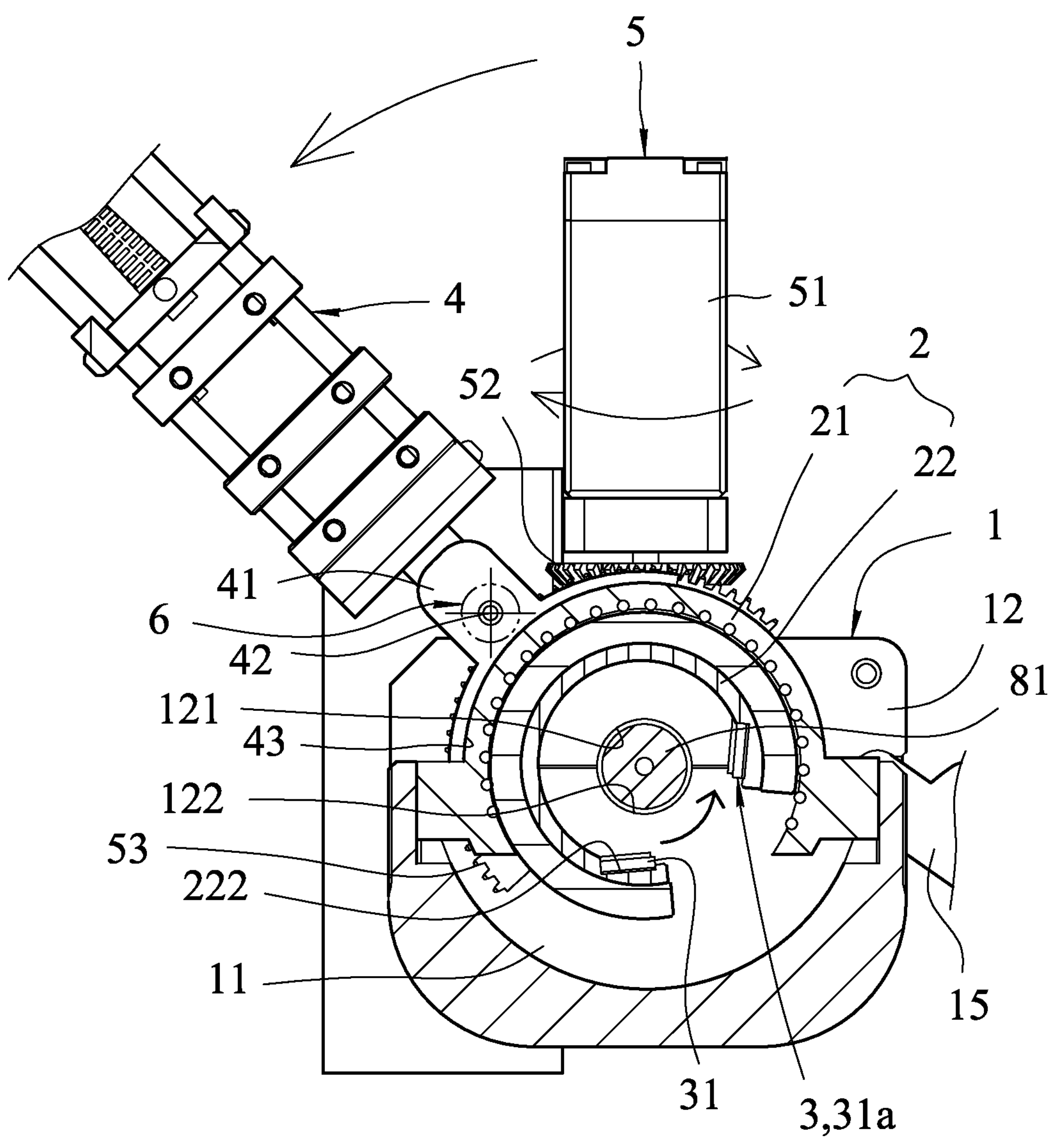
FIG. 7 shows that the drive unit rotates the linkage assembly and the laser unit.

Furthermore, please refer to FIGS. 6 and 7, the drive unit 5 is then activated to drive the driving gear 52 to rotate. The driving gear 52 is engaged with the driven gear 53, which in turn rotates. It is noted that the driving gear 52 and the driven gear 53 are bevel gears, and their rotation directions are perpendicular. Therefore, when the driving gear 52 rotates horizontally, the driven gear 53 rotates vertically. The rotation of the driven gear 53 is linked to the rotation of the tube 22, which is connected to the laser unit 4 through the swinging member 41 and is equipped with the refraction mirror unit 3. As a result, the driven gear 53 drives the tube 22, the laser unit 4, and the refraction mirror unit 3 to rotate together. It is noted that when laser unit 4 rotates, in order to avoid excessive weight to lead deformation and deviation of the trajectory, the pulley 44 of the laser unit 4 slides along the track 14 of the body 1.

Figure 8:
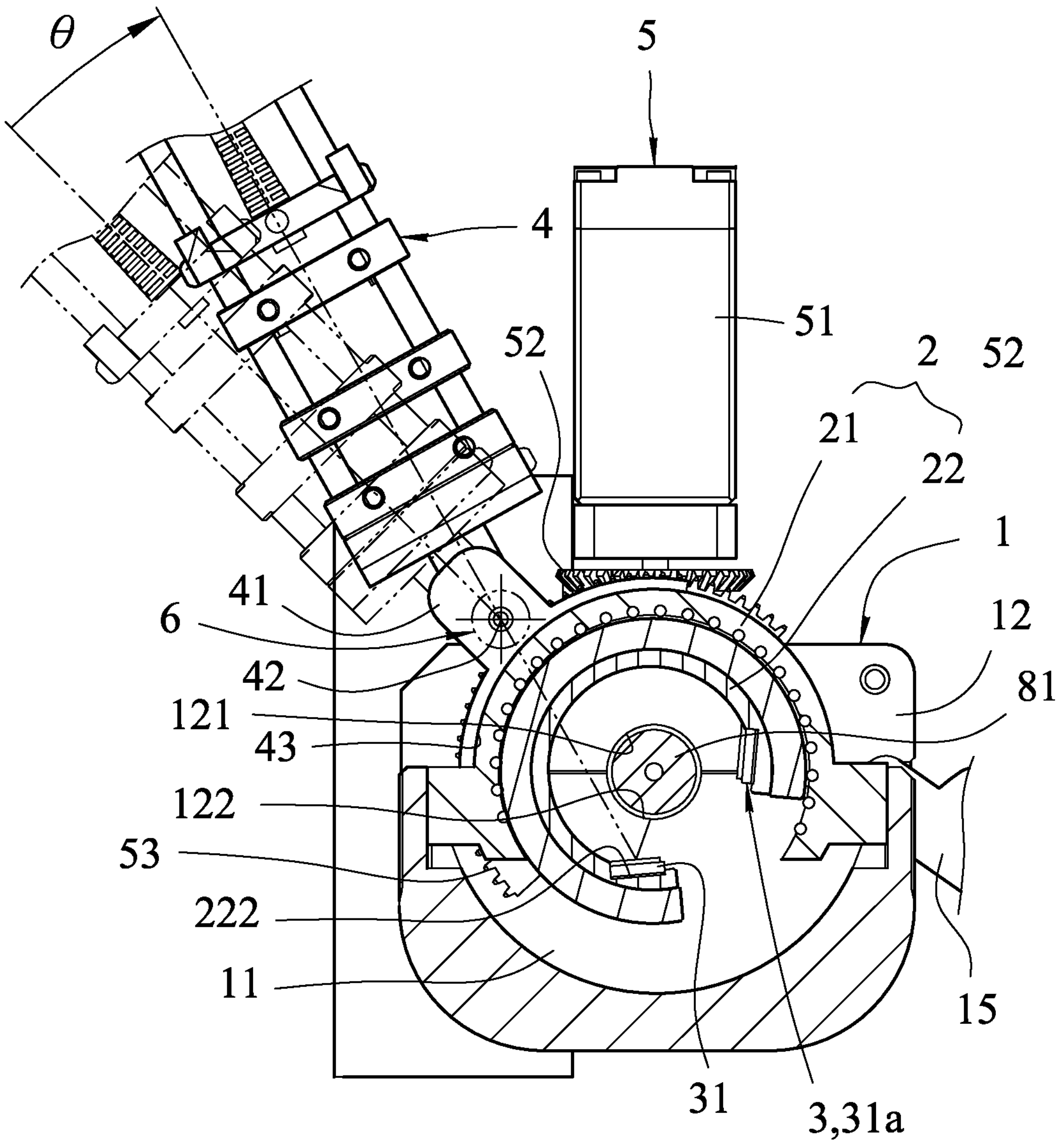
FIG. 8 shows that the rotation unit rotates clockwise the laser unit about the center point.

Additionally, as shown in FIGS. 7 and 8, the rotation unit 6 controls the swinging member 41 of the laser unit 4 to maintain a constant angle 0 (preferably 15 degrees), relative to the laser unit 4. The swinging member 41 rotates the laser unit 4 about the center point 42. That is to say, the swinging member 41 is maintained at the constant angle θ. This angle θ ensures that the laser unit 4 directs the laser beam through the slot 223 of the linkage tube 22 to the mirror surface 31. The mirror surface 31 reflects the laser beam onto the joining faces of the first workpiece 81 and the second workpiece 82, allowing for welding at approximately 120 degrees.

Figure 9:
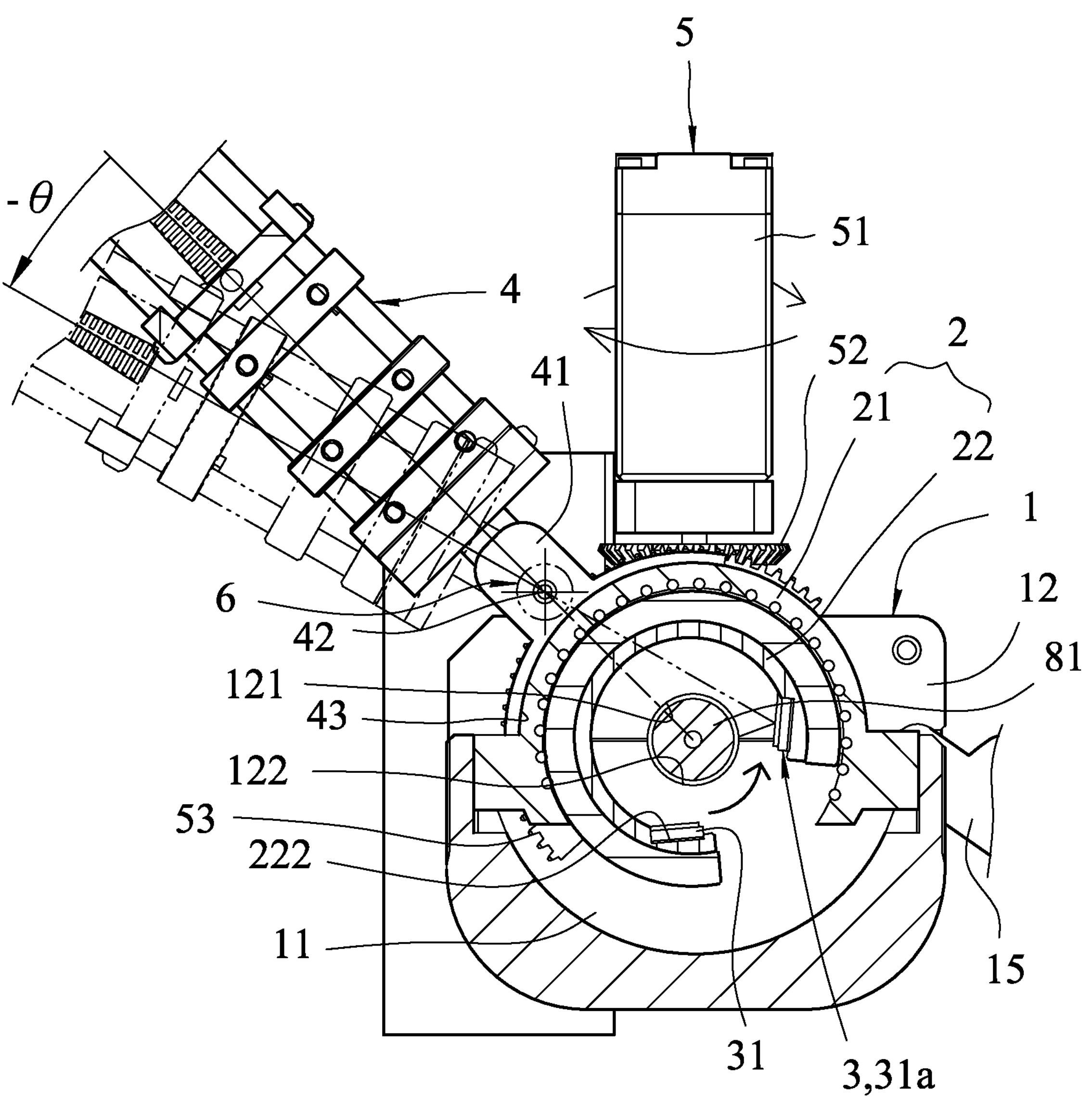
FIG. 9 shows that the rotation unit rotates counter clockwise the laser unit about the center point.

As shown in FIG. 9, the rotation unit 6 controls the laser unit 4 to maintain an angle of −θ (preferably −15 degrees) relative to the swinging member 41. This angle −θ ensures that the laser unit 4 directs the laser beam through the slot 223 of the tube 22 to the mirror surface 31*a*. The mirror surface 31*a* reflects the laser beam onto the other side of the joining faces of the first workpiece 81 and the second workpiece 82, allowing for welding at approximately 120 degrees. Importantly, while the laser unit 4 continues welding, the drive unit 5 is activated to rotate the laser unit 4 continuously. This ensures that the laser beam is continuously reflected by the two mirrors 31, 31*a*, enabling three-stage welding operations on the joining faces of the first workpiece 81 and the second workpiece 82. This fully automated welding process, with the stable rotation of the laser unit 4 and the refraction mirror unit 3, maintains the welding quality of the first workpiece 81 and the second workpiece 82.

While we have shown and described the embodiment in accordance with the present invention, it should be clear to those skilled in the art that further embodiments may be made without departing from the scope of the present invention.

What is claimed is:

1. A laser welding mechanism (A) comprising:

a body (1) having a space (11) formed therein, two securing devices (12) respectively connected to two ends of the body (1);

a linkage assembly (2) comprising a bearing (21) and a tube (22), the bearing (21) connected to two seats (13) on the body (1), the tube (22) connected to the bearing (21) and located within the space (11) of the body (1), the tube (22) having a slot (223) defined through a wall thereof;

a refraction mirror unit (3) with two mirrors (31, 31*a*) each being connected to the tube (22) of the linkage assembly (2);

a laser unit (4) pivotally connected to a swinging member (41), the swinging member (41) having a connecting part (43) connected to the tube (22) of the linkage assembly (2), the laser unit (4) located corresponding to the slot (223) of the tube (22);

a drive unit (5) comprising a motor (51), a driving gear (52), and a driven gear (53), the motor (51) connected to the driving gear (52) which is engaged with the driven gear (53), the driven gear (53) connected to the swinging member (41), and a rotation unit (6) connected to the swinging member (41) of the laser unit (4) and driving the laser unit (4) to rotate an angle.

2. The laser welding mechanism as claimed in claim 1, wherein the body (1) comprises a track (14) connected to the two seats (13).

3. The laser welding mechanism as claimed in claim 2, wherein the laser unit (4) comprises a pulley (44) that cooperates with the track (14) of the body (1), the swinging member (41) of the laser unit (4) has a center point (42).

4. The laser welding mechanism as claimed in claim 1, wherein the body (1) comprises a plate (15) which is connected to one side of the body (1) and located corresponding to the slot (223) of the tube (22).

5. The laser welding mechanism as claimed in claim 1, wherein the bearing (21) of the linkage assembly (2) is a double-row roller bearing, and the bearing (21) has a groove (211) defined in an outer surface thereof.

6. The laser welding mechanism as claimed in claim 5, wherein the tube (22) of the linkage assembly (2) has a protrusion (221), the protrusion (221) is fitted into the groove (211) of the bearing (21).

7. The laser welding mechanism as claimed in claim 1, wherein the drive unit (5) is adjacent to or connected to the body (1).

8. The laser welding mechanism as claimed in claim 1, wherein two respective vertical centerlines of the two mirrors (31, 31*a*) form an angle of 100 degrees with each other.

9. The laser welding mechanism as claimed in claim 1, wherein the rotation unit (6) is driven by a stepper motor, a servo motor, or manual operation.

10. The laser welding mechanism as claimed in claim 9, wherein the rotation unit (6) drives the laser unit (4) to rotate either 15 degrees clockwise or 15 degrees counterclockwise.

* * * * *